(12) United States Patent
Souder et al.

(10) Patent No.: US 7,873,684 B2
(45) Date of Patent: Jan. 18, 2011

(54) AUTOMATIC AND DYNAMIC PROVISIONING OF DATABASES

(75) Inventors: Benny Souder, Belmont, CA (US); James Stamos, Saratoga, CA (US); Lik Wong, Union City, CA (US); John Ciminski, Redwood City, CA (US); Anand Lakshminath, Fremont, CA (US); Alan Downing, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 784 days.

(21) Appl. No.: 10/718,747

(22) Filed: Nov. 21, 2003

(65) Prior Publication Data

US 2005/0038831 A1 Feb. 17, 2005

Related U.S. Application Data

(60) Provisional application No. 60/495,368, filed on Aug. 14, 2003, provisional application No. 60/500,050, filed on Sep. 3, 2003, provisional application No. 60/500,096, filed on Sep. 3, 2003.

(51) Int. Cl.
*G06F 12/00* (2006.01)
*G06F 17/30* (2006.01)

(52) U.S. Cl. ..................... 707/825; 711/162
(58) Field of Classification Search ............... 707/1–10, 707/100–104.1, 200–206, 600–831; 709/225, 709/223; 713/182; 711/161, 162
See application file for complete search history.

(56) References Cited

U.S. PATENT DOCUMENTS

| 4,930,071 | A | 5/1990 | Tou et al. |
| 5,222,235 | A | 6/1993 | Hintz et al. |
| 5,278,978 | A | 1/1994 | Demers et al. |
| 5,396,623 | A | 3/1995 | McCall et al. |
| 5,454,101 | A | 9/1995 | Mackay et al. |
| 5,491,810 | A | 2/1996 | Allen |
| 5,551,020 | A | 8/1996 | Flax et al. |
| 5,579,516 | A | 11/1996 | Van Maren et al. |
| 5,687,343 | A | 11/1997 | Fecteau et al. |
| 5,692,174 | A | 11/1997 | Bireley et al. |

(Continued)

FOREIGN PATENT DOCUMENTS

| EP | 0 942 363 A2 | 9/1999 |
| EP | 0942363 | 9/1999 |
| EP | 0 992 909 A2 | 4/2000 |
| EP | 1 170 662 A2 | 1/2002 |
| WO | WO 02/05116 A2 | 1/2002 |

(Continued)

OTHER PUBLICATIONS

Wickremesinghe et al., Distributed computing with load-managed active storage, 2002, IEEE, 13-23.*

(Continued)

*Primary Examiner*—Jean B Fleurantin
(74) *Attorney, Agent, or Firm*—Hickman Palermo Truong & Becker LLP

(57) ABSTRACT

Approaches described herein may be used for provisioning of databases that requires a bulk transfer of data within a distributed computing environment, such as a grid. The approaches do not require the manual intervention of a DBA to, for example, transfer a tablespace between the file systems of operating systems. Instead, the tablespaces may be provisioned automatically and dynamically by a grid computing system whenever it determines the need to dynamically provision a database. In addition, as copies of tablespaces are provisioned, synchronization mechanisms can also be automatically provisioned to keep the tablespaces and their copies in sync.

24 Claims, 6 Drawing Sheets

U.S. PATENT DOCUMENTS

| | | | |
|---|---|---|---|
| 5,717,915 | A | 2/1998 | Stolfo et al. |
| 5,758,345 | A * | 5/1998 | Wang ........................ 707/100 |
| 5,781,911 | A | 7/1998 | Young et al. |
| 5,787,445 | A | 7/1998 | Daberko |
| 5,787,446 | A | 7/1998 | Dang et al. |
| 5,787,471 | A | 7/1998 | Inoue et al. |
| 5,819,298 | A | 10/1998 | Wong et al. |
| 5,822,749 | A | 10/1998 | Agarwal |
| 5,832,509 | A | 11/1998 | Mortis et al. |
| 5,864,853 | A | 1/1999 | Kimura et al. |
| 5,870,746 | A | 2/1999 | Knutson et al. |
| 5,890,167 | A | 3/1999 | Bridge, Jr. et al. |
| 5,890,169 | A | 3/1999 | Wong et al. |
| 5,924,097 | A | 7/1999 | Hill et al. |
| 5,937,408 | A | 8/1999 | Shoup et al. |
| 5,943,677 | A | 8/1999 | Hicks |
| 5,951,694 | A | 9/1999 | Choquier et al. |
| 5,970,502 | A | 10/1999 | Salkewicz et al. |
| 6,014,614 | A | 1/2000 | Herring et al. |
| 6,014,670 | A | 1/2000 | Zamanian et al. |
| 6,032,158 | A | 2/2000 | Mukhopadhyay et al. |
| 6,035,298 | A | 3/2000 | McKearney |
| 6,035,412 | A | 3/2000 | Tamer et al. |
| 6,041,357 | A | 3/2000 | Kunzelman et al. |
| 6,044,374 | A | 3/2000 | Nesamoney et al. |
| 6,088,728 | A | 7/2000 | Bellemore et al. |
| 6,098,076 | A | 8/2000 | Rekieta et al. |
| 6,101,497 | A | 8/2000 | Ofek |
| 6,108,657 | A | 8/2000 | Shoup et al. |
| 6,108,748 | A | 8/2000 | Ofek et al. |
| 6,122,636 | A | 9/2000 | Malloy et al. |
| 6,151,601 | A | 11/2000 | Papierniak et al. |
| 6,151,608 | A | 11/2000 | Abrams |
| 6,208,990 | B1 | 3/2001 | Suresh et al. |
| 6,222,840 | B1 | 4/2001 | Walker et al. |
| 6,233,537 | B1 | 5/2001 | Gryphon et al. |
| 6,247,008 | B1 | 6/2001 | Cambot et al. |
| 6,249,786 | B1 | 6/2001 | Wadewitz |
| 6,272,503 | B1 * | 8/2001 | Bridge et al. ............... 707/204 |
| 6,339,775 | B1 | 1/2002 | Zamanian et al. |
| 6,434,558 | B1 | 8/2002 | MacLeod et al. |
| 6,442,568 | B1 | 8/2002 | Velasco et al. |
| 6,442,663 | B1 | 8/2002 | Sun et al. |
| 6,442,748 | B1 | 8/2002 | Bowman-Amuah |
| 6,453,038 | B1 | 9/2002 | McFarlane et al. |
| 6,484,179 | B1 | 11/2002 | Roccaforte |
| 6,490,590 | B1 | 12/2002 | Fink |
| 6,549,922 | B1 | 4/2003 | Srivastava et al. |
| 6,604,104 | B1 | 8/2003 | Smith |
| 6,604,110 | B1 | 8/2003 | Savage et al. |
| 6,611,838 | B1 | 8/2003 | Ignat et al. |
| 6,643,652 | B2 | 11/2003 | Hegeson et al. |
| 6,691,155 | B2 | 2/2004 | Gottfried |
| 6,694,306 | B1 | 2/2004 | Nishizawa et al. |
| 6,694,505 | B1 | 2/2004 | Tan |
| 6,757,689 | B2 | 6/2004 | Battas et al. |
| 6,785,673 | B1 | 8/2004 | Fernandez et al. |
| 6,792,431 | B2 | 9/2004 | Tamboli et al. |
| 6,839,724 | B2 | 1/2005 | Manchanda et al. |
| 6,978,282 | B1 * | 12/2005 | Dings et al. .................. 707/204 |
| 6,993,657 | B1 * | 1/2006 | Renner et al. ............... 713/182 |
| 6,996,566 | B1 | 2/2006 | George et al. |
| 7,058,958 | B1 | 6/2006 | Shutt et al. |
| 7,487,168 | B2 | 2/2009 | Rys et al. |
| 2001/0047270 | A1 | 11/2001 | Gusick et al. |
| 2002/0073139 | A1 | 6/2002 | Hawkins et al. |
| 2002/0091702 | A1 * | 7/2002 | Mullins ...................... 707/100 |
| 2002/0143733 | A1 * | 10/2002 | Mukkamalla et al. .......... 707/1 |
| 2002/0156796 | A1 | 10/2002 | Hisamatsu et al. |
| 2002/0161896 | A1 | 10/2002 | Wen et al. |
| 2002/0169745 | A1 | 11/2002 | Hotti et al. |
| 2003/0005028 | A1 | 1/2003 | Dritschler et al. |
| 2003/0140055 | A1 | 7/2003 | Doney et al. |
| 2003/0172158 | A1 * | 9/2003 | Pillai et al. .................. 709/225 |
| 2003/0208505 | A1 * | 11/2003 | Mullins et al. .............. 707/102 |
| 2003/0212789 | A1 * | 11/2003 | Hamel et al. ................ 709/225 |
| 2003/0236834 | A1 | 12/2003 | Gottfried |
| 2004/0034615 | A1 | 2/2004 | Thomson et al. |
| 2004/0034669 | A1 * | 2/2004 | Smith et al. .................. 707/201 |
| 2004/0064487 | A1 | 4/2004 | Nguyen et al. |
| 2004/0068509 | A1 | 4/2004 | Garden et al. |
| 2004/0073567 | A1 | 4/2004 | Pelon |
| 2004/0088297 | A1 | 5/2004 | Coates et al. |
| 2004/0091114 | A1 | 5/2004 | Carter et al. |
| 2004/0153459 | A1 | 8/2004 | Whitten et al. |
| 2004/0182225 | A1 | 9/2004 | Ellis et al. |
| 2005/0256908 | A1 | 11/2005 | Yang et al. |

FOREIGN PATENT DOCUMENTS

| | | |
|---|---|---|
| WO | WO 02/07037 A | 1/2002 |
| WO | WO 02/07037 A1 | 1/2002 |
| WO | WO 02/097676 A2 | 12/2002 |
| WO | WO 03/014928 A1 | 2/2003 |
| WO | WO 03/014928 A2 | 2/2003 |
| WO | WO 03/062983 A2 | 7/2003 |

OTHER PUBLICATIONS

Wiederhold et al., Consistency control of replicated data in federated databases, Jul. 12, 1990, IEEE, 130-132.*

Current Claims in PCT application, International Application No. PCT/US03/23747, 14 pages.

International Searching Authority, "Notification of Transittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

International Searching Authority, "Notification of Transmittal of the International Search Report and the Written Opinion of the International Searching Authority, or the Declaration," Aug. 4, 2005, 13 pages.

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5.

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

International Preliminary Examining Authority, "Notification of Transmittal of International Preliminary Report on Patentability," PCT/US2004/025805, dated Nov. 18, 2005, 16 pages.
International Searching Authority, "Notification of Transmittal of the International Search Report and the Written Opinion of the International Searching Authority, or the Declaration," PCT/US2004/026405, dated Jan. 6, 2006, 13 pages.
Current Claims, PCT/US2004/026405, 7 pages.
R. Hugo Patterson et al., "Informed Prefetching and Caching", *ACM 1995*, pp. 79-95.
"Optimizing Development Productivity Using UML in Oracle9iJ Developer," Oracle, Dec. 2001, 21 pages.
"UML Distilled Applying the Standard Object Modeling Language", Martin Fowler et al., 1997, whole book.
"Object-Oriented Modeling and Design," James Rumbaugh et al, Nov. 14, 1990, pp. 366-396.
Oracle Corporation, "Oracle9*i* Application Server: Business Intelligence Technical Overview," Jun. 2003, An Oracle White Paper, http://otn.oracle.com/products/bi/pdf/bi_overview.pdf, pp. 1-13.
Oracle Corporation, "ETL Processing with Oracle9*i*," Jun. 2001, An Oracle White Paper, http://otn.oracle.com/products/bi/pdf/bi_overview.pdf, pp. 1-18.
Oracle Corporation, "Oracle9*i* for e-Business: Business Intelligence," Jun. 2001, An Oracle White Paper, http://otn.oracle.com/products/oracle9i/pdf/o9i_bi_twp.pdf, pp. 1-18.
Oracle Corporation. "Oracle 9*i* Warehouse Builder, Architectural White paper" Jan. 2003, http://otn.oracle.com/products/warehouse/pdf/OWB_Architecture_WhitePaper.pdf, pp. 1-16.
Shiva, S.G., et al., "Modular Description/Simulation/Synthesis Using DDL," 19th Design Automation Conference 1982, IEEE Press, pp. 321-329.
Spiegler, Israel, "Automating Database Construction," ACM SIGMIS Database, vol. 14, Issue 3, Spring 1983, pp. 21-29.
Claus Hagen, et al., "Highly Available Process Support Systems: Implementing Backup Mechanisms," 1999, IEEE, pp. 112-121.
IBM Corp., "Conditional Container Reuse for Database and Tablespace Restore," IBM Technical Disclosure Bulletin, vol. 39, No. 12, Dec. 1996, XP-002240529, pp. 199-200.
R. W. Dey, et al., IBM Corp., "Data Space Manager," IBM Technical Disclosure Bulletin, vol. 25, No. 11A, Apr. 1983, XP-000714243, pp. 5456-5459.
Oracle Corporation, "Advanced Analytic Services," 1996-2001, Oracle9i Warehousing Guide, Release 1 (9.0.1), Part No. A90237-01, http://download-west.oracle.com/docs/cd/A91202_01/901_doc/server.901/a90237, data retrieved Aug. 6, 2004, pp. 1-5.
Oracle Corporation, "Transforming Tables into Multidimensional Data Structures," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.
Oracle Corporation, "Understanding the OLAP API," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.
Oracle Corporation, "Controlling the Flow of Execution," 1996-2001, Oracle9i OLAP Services Developer's Guide to the OLAP DML, Release 1 (9.0.1), Part No. A86720-01, http://download-west.oracle.com/docs/cd/A91202_01/901_doc/olap.901/a86720/, data retrieved Aug. 6, 2004, pp. 1-4.
Chase, Jeffrey S., "Dynamic Virtual Clusters in a Grid Site Manager," Proceedings of the IEEE International Symposium on HPDC-2003, XP010463715, pp. 90-100.
International Searching Authority, "Notification of the Transmittal of the International Search Report and the Written Opinion of the International Searching Authority, or the Declaration", PCT/US2004/026405, dated Aug. 19, 2005, 5 pages.
Claims, PCT/US2004/026405, 7 pages.
Spalding Office Systems, "DocuWare Document Server Specifications," Sep. 2, 2003, http://web.archive.org/web/20030902215629/http://spaldingoffice.com/includes/static-documents/site/docuData/docserverspec.htm/, retrieved on Feb. 6, 2007, 2 pages.
Naude, Frank, "Oracle FAQ: Glossary of Terms," Feb. 28, 2001, http://web.archive.org/web/20010228061218/http://www.orafaq.com/glossary/faqlosr.htm, retrieved on Feb. 6, 2007, 3 pages.
Microsoft Corporation, Migrating your Access Database to Microsoft SQL Server 7.0, Feb. 1999, http://msdn2.microsoft.com/en-us/library/aa226083(sql.70).aspx, retrieved on Feb. 6, 2007, 8 pages.
Software Resource International, "Application Migration Services," Aug. 5, 2002, http://www.softresint.com/pub/SPD/01-04-012.pdf, 2 pages.
Swierk, Edward et al., "The Roma Personal Metadata Service," Oct. 2001, http://.hpl.hp.com/personal/Mary_Baker/publications/ROMA-WMCSA2000.pdf, pp. 1-10.
European Patent Office, "Communication Pursuant to Article 96(2) EPC," App. No. 04781256.3 (50277-2985), dated Feb. 2, 2007, 4 pages.
Claims, App. No. 04781256.3 (50277-2985), pp. 34-36.
Kokku, Ravi et al., "Half-Pipe Anchoring: An Efficient Technique for Multiple Connection Handoff," Proceedings of the 10th International Conference of Network Protocols, Nov. 12, 2002, 10 pages.
U.S. Appl. No. 10/783,779, filed Feb. 20, 2004, Final Office Action, May 24, 2010.

\* cited by examiner

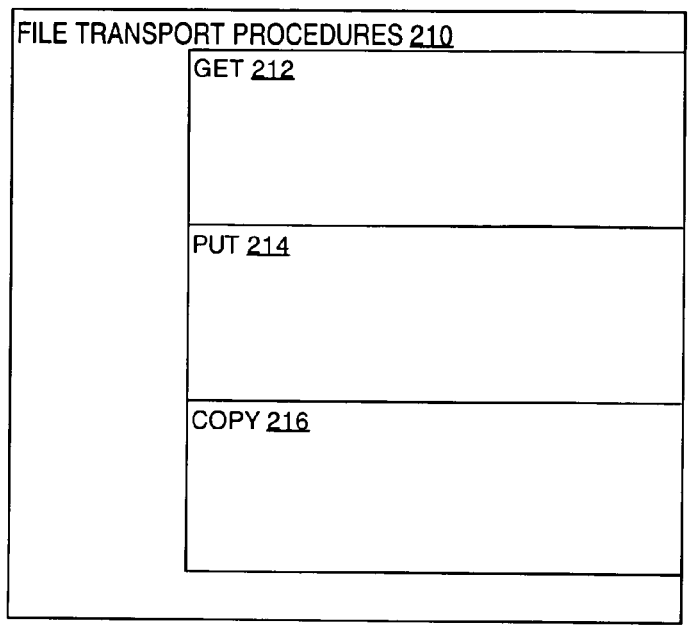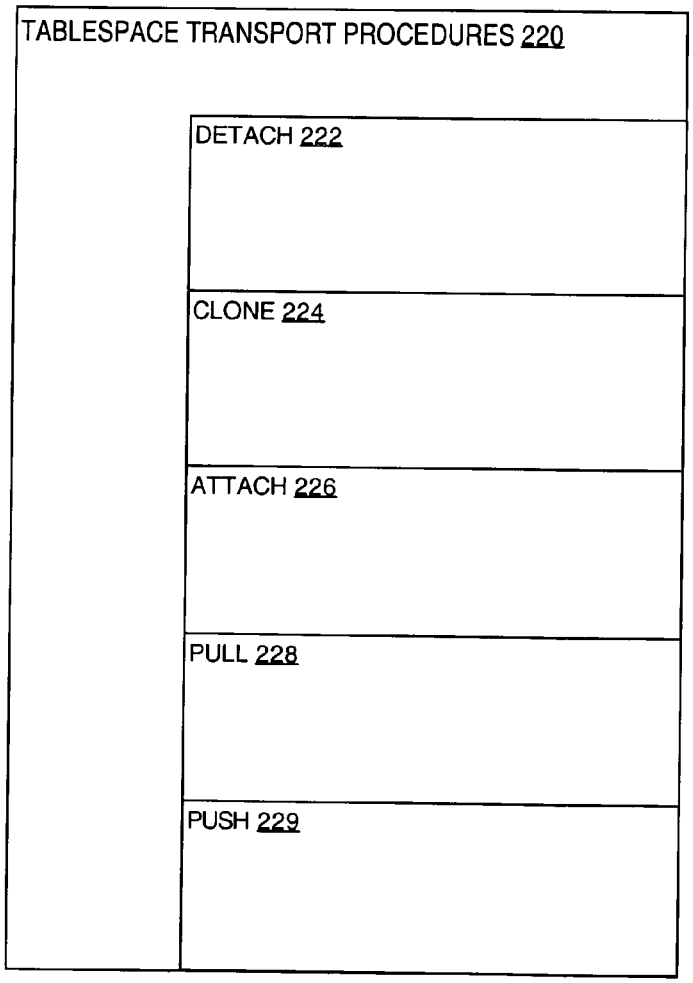
FIG. 2
DATA TRANSPORT PROCEDURES 150

AUTOMATIC AND DYNAMIC PROVISIONING OF DATABASES

RELATED APPLICATIONS

This application claims priority to U.S. Provisional Application No. 60/495,368, entitled Computer Resource Provisioning, filed by Debashish Chatterjee, et al. on Aug. 14, 2003, the contents of which are incorporated herein by reference; this application claims priority to U.S. Provisional Application No. 60/500,050, entitled Automatic And Dynamic Provisioning Of Databases, filed by Benny Souder, et al. on Sep. 3, 2003, the contents of which are incorporated herein by reference; this application claims priority to U.S. Provisional Application 60/500,096, entitled Service Based Workload Management and Measurement in a Distributed System, filed by Carol Colrain, et al. on Sep. 3, 2003, the contents of which are incorporated herein by reference.

The following applications are related to the current application:

- U.S. Provisional Application No. 60/410,883, entitled Oracle Streams, filed by Alan Downing, et al. on Sep. 13, 2002, the contents of which are incorporated herein by reference;
- U.S. Provisional Application No. 60/400,532, entitled Utilizing Rules in Distributed Information Sharing, filed by Edwina Lu, et al. on Aug. 1, 2002, the contents of which are incorporated herein by reference;
- U.S. application Ser. No. 10/449,873, entitled Utilizing Rules in a Distributed Information Sharing System, filed by Edwina Lu, et al. on May 30, 2003, the contents of which are incorporated herein by reference; and
- U.S. application Ser. No. 10/353,381, entitled Pluggable Tablespaces For Database Systems, filed by Juan R. Loaiza, et al. on Jan. 28, 2003, the contents of which are incorporated herein by reference.

FIELD OF THE INVENTION

The present invention relates to distributed database systems, and in particular, to allocating resources in a database system to meet varying workload demands.

BACKGROUND OF THE INVENTION

Enterprises are looking at ways of reducing costs and increasing efficiencies of their data processing system. A typical enterprise data processing system allocates individual resources for each of the enterprise's applications. Enough reassures are acquired for each application to handle the estimated peak load of the application. Each application has different load characteristics; some applications are busy during the day; some others during the night; some reports are run once a week and some others once a month. As a result, there is a lot of resource capacity that is left unutilized. Grid computing enables the utilization or elimination of this unutilized capacity. In fact, Grid computing is poised to drastically change the economics of computing.

A grid is a collection of commodity computing elements that provide processing and some degree of shared storage; the resources of a grid are allocated dynamically to meet the computational needs and priorities of its clients. An example of a grid is a rack of server blades. Each server blade is an inclusive computer system, with processor, memory, network connections, and associated electronics on a single motherboard. Typically, server blades do not include onboard storage (other than volatile memory), and they share storage units (e.g. shared disks) along with a power supply, cooling system, and cabling within a rack.

Grid computing can dramatically lower the cost of computing, extend the availability of computing resources, and deliver higher productivity and higher quality. The basic idea of Grid computing is the notion of computing as a utility, analogous to the electric power grid or the telephone network. A client of the Grid does not care where its data is or where the computation is performed. All a client wants is to have computation done and have the information delivered to the client when it wants.

At a high level, the central idea of Grid computing is computing as a utility. A client of a Grid should not have to care where its data resides, or what computer element processes a request. The client need only request information or computation and have it delivered—as much as needed and whenever needed. This is analogous to the way electric utilities work; a customer does not know where the generator is, or how the electric grid is wired. The customer just asks for electricity and gets it. The goal is to make computing a utility——a ubiquitous commodity. Hence it has the name, the Grid.

This view of Grid computing as a utility is, of course, a client side view. From the server side, or behind the scenes, the Grid is about resource allocation, information sharing, and high availability. Resource allocation ensures that all those that need or request resources are getting what they need. Resources are not standing idle while requests are left unserviced. Information sharing makes sure that the information clients and applications need is available where and when it is needed. High availability ensures that all the data and computation must always be there——just as a utility company must always provide electric power.

Grid Computing for Databases

One area of computer technology that can benefit from Grid computing is database technology. A grid can support multiple databases and dynamically allocate resources as needed to support the load on each database. As the load for a database increases, more resources are allocated for that database. For example, on an enterprise grid, a database is being serviced by one database server running on one server blade on the grid. The number of users requesting data from a database increases. In response to this increase in the demand for the database, another database server is provisioned on one or more other server blades.

Provisioning for Database Grid

The term provisioning refers to providing and configuring the computational resources and data needed to provide a service. Provisioning a database server includes configuring a computer element to run the database server and configuring the database server to manage a database. Provisioning a database includes moving a database to where a database server may access it and configuring the database server to manage the database.

The process of provisioning data or a database is referred to herein as data provisioning. Provisioning a database in a grid may require cloning all or part of the database, followed by provisioning a new database server to manage the clone or incorporating the clone into another database already being managed by an already running database server.

Data provisioning of a database can also involve the bulk transfer of data between file systems and/or databases. Unfortunately, techniques for bulk transfer of data that are used for database provisioning entail manual intervention and therefore cannot be used to effectively provision data automatically and dynamically as is required for grid computing.

An example of an approach for data provisioning that uses a technique for bulk transfer of data is the transportable tablespace approach. A tablespace is a collection of storage containers (e.g. files) used to store data for database objects (e.g. relational tables). Under this approach, tablespaces are exported from a "source database" and imported into a "target database". This capability allows the files of a tablespace to be copied using operating system utilities for copying files, which run much faster than the other techniques for bulk transfer of data between databases. Such other techniques involve executing queries and insert statements.

To transport a tablespace, a human database administrator ("DBA") performs manual steps. First, the tablespace must be imported into the target tablespace by attaching the tablespace. With respect to a tablespace, database, and database server, the term "attach" refers to configuring a database and/or database server so that the database objects in the tablespace are incorporated within the database and the tablespace is used to store data for the database. Configuring a database to attach a tablespace involves modifying database metadata so that it defines the tablespace and database objects as part of the database. The database metadata may be altered using a variety of techniques involving manual steps performed by a DBA. The DBA can run utilities available on the source database system that may be executed to export the metadata into a "metadata dump file", and run utilities on the target database system to construct metadata from the metadata dump file. Alternately, metadata can be included with the data being transported in the tablespace, and the target database would reconstruct the metadata from the metadata included in the tablespace. The DBA can also manually reconstruct the metadata on the target database system.

A tablespace may be transported to a database by creating a separate copy of the tablespace from the original source database and attaching it to the target database. While the copy is being made, operations on the tablespace are restricted to read-only operations. The DBA sends commands to instruct a database server managing the database to restrict database operations performed on the tablespace to read-only operations. Once the copy is complete, the DBA may send commands to instruct the database server that modification operations can be performed.

The term "copy," as used herein, refers to both the source data and a duplicate of the source data. For example, a copy of a source file may be the source file itself, or another file that is a duplicate that can be generated using, for example, readily available copy utilities, such as operating system utilities for creating copies of files.

The copy of a tablespace transported may also be detached from a database. With respect to a particular tablespace and database and database server, the term detach refers to configuring a database and/or database server so that a tablespace is no longer used to store data for the database. Configuring a database to detach a tablespace includes altering database metadata in the source database system, by, for example, removing metadata defining the tablespace as part of the source database system, or setting a flag to indicate that the tablespace is no longer used. This step is performed by the DBA by running utilities or by manually editing the source database metadata.

The tablespaces for the source database are stored in a "source directory" of a file system and the tablespaces of the target database system are stored in a "target directory" of a file system. The source and target directories may be within the same file system or a different file system on a different computer system. In any case, the DBA needs to transfer the tablespace using operating system utilities. This requires that the DBA have an operating system account on the computer system of the target directory. The DBA logs onto the computer system and runs a utility to transfer the tables from the source directory to the target directory. If the target directory is in another file system of another computer system, the DBA can use FTP to transfer the file (i.e. use a utility that follows the File Transfer Protocol). To use FTP, the DBA needs an operating system account on the computer system of the target directory to log onto the computer system and transfer the tablespace files.

As demonstrated above, conventional bulk transfer of data techniques for provisioning a database require manual intervention on the part of a human DBA. Because Grid computing requires that data provisioning be performed automatically and dynamically, database provisioning that requires the bulk transfer of data is not amenable for Grid computing. Clearly, there is need for automated bulk transferring of databases that is suitable for dynamic data provisioning within a grid.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram of procedure used to automatically and dynamically provision tablespaces according to an embodiment of the present invention.

DETAILED DESCRIPTION OF THE INVENTION

A method and apparatus for automatic and dynamic provisioning of databases is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Approaches described herein may be used for provisioning of databases that requires a bulk transfer of data within in a distributed computing environment, such as a grid. The approaches do not require the manual intervention of a DBA to, for example, transfer a tablespace between the file systems of operating systems. Instead, the tablespaces may be provisioned automatically and dynamically by a grid computing system whenever it determines the need to dynamically provision a database. In addition, as copies of tablespaces are provisioned, synchronization mechanisms can also be automatically provisioned to keep the tablespaces and their copies in sync.

Exemplary Distributed Database System

Figure 1:
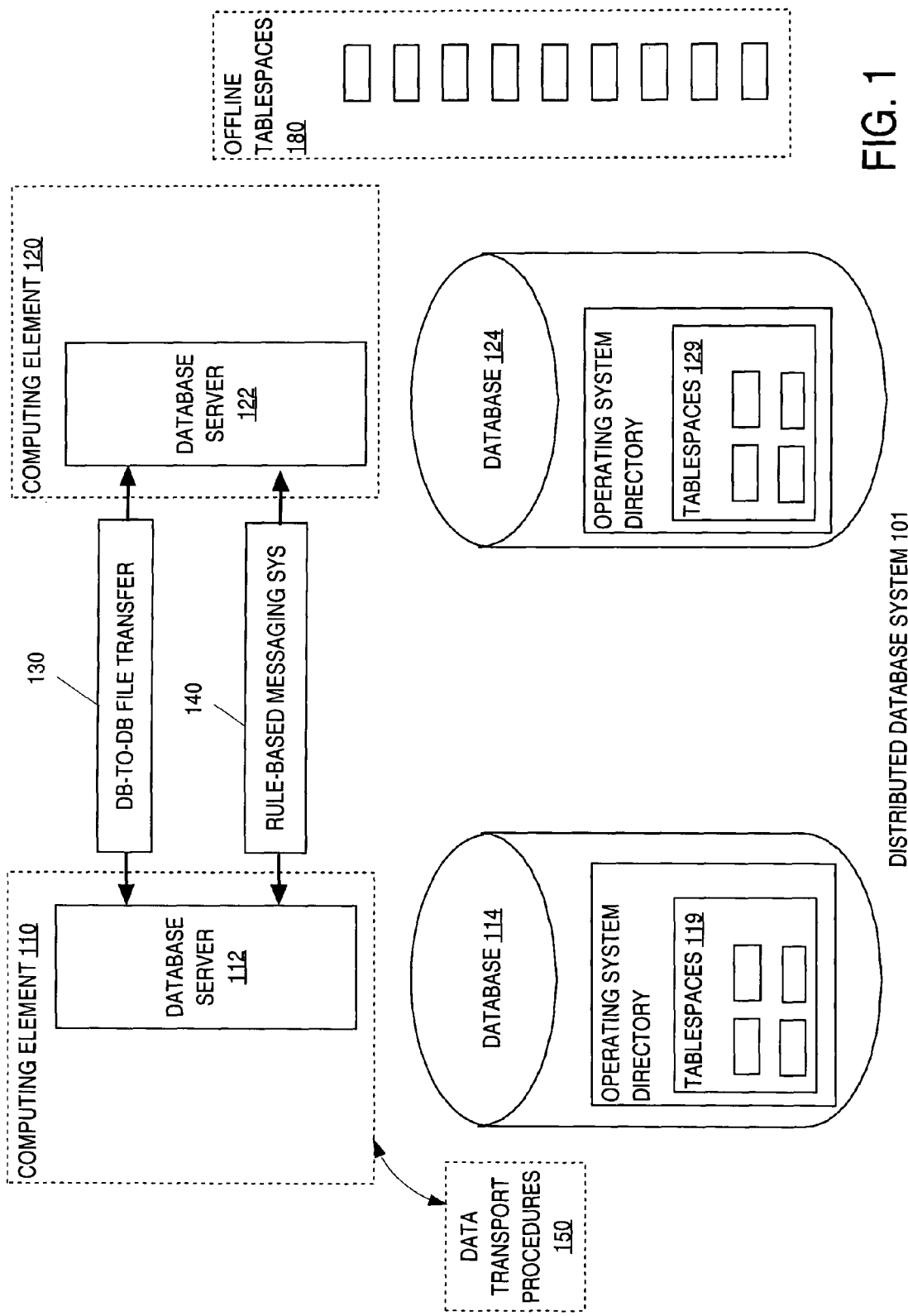
FIG. 1 is a block diagram depicting a distributed database system upon which an embodiment of the present invention may be implemented.

FIG. 1 shows a distributed database system 101 that may be used to implement an embodiment of the present invention. Distributed database system 101 includes database server 112 and database server 122. Database server 112 manages access to database 114 and database server 122 manages access to database 124. A database server, such as database servers 112 and 122, is a combination of a set of integrated software components and an allocation of computational resources, such as memory and processes for executing the set of integrated software components on a processor, where the combination of software and computational resources are used for managing a database. Among other functions of database management, a database server governs and facilitates access to a database, processing requests by database clients to access the database. The database clients of a database server may include other database servers. Database 110 is a collection of database objects. Database objects include any form of structured data. Structured data is data structured according to a metadata description defining the structure. Structured data includes relational tables, object tables, object-relational tables, and bodies of data structured according to the Extensible Markup Language ("XML"), such as XML documents.

Tablespaces 119 and 129 are "online" because each of them is defined as being part of a database. Offline tablespaces, such as offline tablespaces 180, are tablespaces that are detached, that is, not defined as being part of a database. The approaches described herein can be used to provision copies of online tablespaces and offline tablespaces.

Database 114 is referred to as a local database with respect to database server 112 because database server 112 does not require another database server to access database 114 on database server 112's behalf. However, to access database 124, database server 112 must request access from database server 122, which accesses the data on behalf of database server 112. Therefore, database 124 is not a local database of database server 112.

As mentioned before, a tablespace is a collection of storage containers. According to an embodiment of the present invention, the storage containers are files defined and managed by an operating system. An operating system is software that controls and manages a computer element's resources. Other software that is executed on the computer element, herein "applications", are executed by processes that operate under the control of the operating system. The software components of a database server are an example of an application. Access by processes executing the applications to the resources is also controlled by the operating system. Applications access the resources by calling operating system routines and utilities.

Files defined and managed by an operating system are stored in persistent storage, such as disk storage, and organized as a hierarchy of directories that contain files and other directories. A file system directly controlled by an operating system on a computer element is referred to as a local file system with respect to the operating system. The files within the file system are referred to as local files with respect to the operating system. A file system is directly controlled by a particular operating system if access to the file system does not require another operating system to access the file system on the particular operating system's behalf. Thus, a file system in a shared disk system may be controlled by more than one operating system.

An operating system on a computing element that controls an application or a process is referred to herein as a local operating system with respect to the application or process. Likewise, the application or process is referred to as a local application or local process with respect to the operating system.

Processes executing under the control of an operating system are associated with an operating system account established by operating system functions responsible for registering accounts. Initiating a process for a user requires that the user logon under an account using an operating system function for logging on users.

While an operating system controls the resources of a computing element, the control can be shared with applications, which share control jointly with and subordinate to an operating system. For example, database server 112 is comprised of multiple "database server processes" associated with an operating system account. Processes associated with this operating system account, which include the multiple database server processes, are granted exclusive read and write privileges by the operating system of computer element 110 to directories in the local file system of the operating system. Access by the database server processes to data in the directories is managed by database server 112. Processes associated with other operating system accounts may not access these directories. In this way, database server 112 shares joint and subordinate control over these directories and the files within them.

An operating system provides various functions and utilities that allow resources to be managed and handled in a certain way. For example, the operating system of computer element 110 can treat disk drives as a Redundant Array of Independent (or Inexpensive) Disks. Likewise, a database server can provide similar capabilities.

Database transport procedures 150 include routines that may be invoked by a database server to perform a specific set of steps needed to provision a tablespace. A procedure may perform some or all the steps needed to provision a tablespace, including steps conventionally and manually performed by a DBA. The procedures may be invoked to automatically and dynamically provision a database.

Data Transport Mechanisms

Database servers 112 and 122 transmit data between each other using various data transport mechanisms ("transport mechanisms"). These transport mechanisms include Database Server to Database Server file transport mechanism 130 ("DB file transport mechanism") and rule-based messaging system 140. For purposes of exposition, DB file transport mechanism 130 and rule-based messaging system 140 are depicted in FIG. 1 using blocks that are separate and distinct from those used to represent database servers 112 and 122. However, these mechanisms may include software components that are integrated within either database server 112 and 122 and that participate to transmit data along an interconnect (e.g. network, bus) between the database servers. In fact, these transport mechanisms may use queues and tables within databases 114 and 124, or files under the control of database servers 112 and 122, and may use procedures from database transport procedures 150.

DB file transport mechanism 130 is a transport mechanism dedicated to transferring files between database servers 112 and 122. The files may be transported from one or more directories in a local file system of database server 112 to one or more directories of a local file system of database server 122. A local file system of a database server is a local file system of an operating system that controls the database server. Thus, a local file system of database server 112 is the local file system of the operating system of computer element 110. According to an embodiment of the present invention, the files are transported using a protocol similar to FFP.

DB file transport mechanism 130 is distinguishable from conventional file transport mechanisms as follows. It is a database server component that (1) only transports data in the form of files, and (2) transports a file between database servers, which either retrieve the file from a local file system and, upon receipt of the file, stores it in a local file system, and (3) transports files in this way in response to a request to transport them, where the request designates the specific files to transport and the location (e.g. directory) of the source and the destinations. The files transported maybe binary files or text files. DB file transport mechanism 130 also performs character-set conversion, converting the character-set format of the file transported.

While clearly transport mechanisms have transported files between file system directories, such mechanisms did not comprise software components that are integrated components of a database server. Furthermore, database servers 112 and 122, unlike conventional database servers, are configured to recognize commands that specify files to be transported between directories. Such commands can be entered by a user via a command line interface that also accepts queries that conform to a database language, such as SQL. The commands that specify files to transport specify a file name, including a directory path of the file's location, and a file name and directory path to which to transport the file.

Rule-Based Messaging System

Rule-based messaging system 140 transmits messages between database server 112 and database server 122. The message contains information about events, events such as the creation or modification of data. Messages are used to propagate events that occur at one database server to another database server. The other database server may then transmit the message to yet another database server.

A common use of a messaging system is to replicate data. DML changes made to a database object at a database server are propagated to another database server that maintains replicas of at least a portion of the database object. Rule-based messaging system 140 may be used to transport a wide range of types of data, including files.

The message flow needed from one messaging system to another messaging system may differ. Various types of messaging systems provide the ability for users to configure the message flow between nodes in a network. One type of messaging system is a rule-based messaging system, such as rule-based messaging system 140, which allows a user to specify rules that govern the flow of messages.

A rule specifies a condition and an action to perform if the condition is met. In general, rules comply with a rules language, which is like a computer language. Messaging systems that use rules expose information about events through variables or attributes that can be referenced by the rules. The condition in a rule may be expressed using boolean expressions that reference the variables and attributes. The rules may be used to select which events for which messages are sent to other nodes, and what to do with a message received from another node.

Database Transport Procedures

FIG. 2 depicts database transport procedures 150 in greater detail according to an embodiment of the present invention. Database transport procedures 150 include file transport procedures 210 and transportable tablespace procedures 220. File transport procedures 210 include routines related to transferring files between database servers while tablespace transport procedures 220 include procedures related to transporting tablespaces. These procedures may be invoked by a database server or user through a user interface, such as a command line interface. An invocation of a database server may specify one or more parameters and may return one or more values (e.g. function call value or parameter return values). The parameters are used to specify, for example, what tablespace to detach or which file to transport.

According to an embodiment of the present invention, database transport procedures 150 are written in a combination of C and PL/SQL™. PL/SQL is a procedural database language available from Oracle™ Corporation. However, the present invention is not limited to database transport procedures that are written in a particular computer language.

File transport procedures 210 include procedures get 212, put 214, and copy 216, as follows.

Get 212 This procedure causes a "destination" database server to request from a "source" database server a file local to the source database server. The source database server transmits the requested file to the destination database server. The request and the file may be transported using DB file transport mechanism 130.

Put 214 This procedure causes a source database server to contact a destination database server to create, in the local file system of the destination database server, a copy of a file from the local file system of the source database server. The source database server transmits the requested file to the destination database server. The file may be transported using DB file transport mechanism 130. This procedure may be used by rule-base messaging system 140 to propagate a file via DB file transport mechanism 130.

Copy 216 This procedure causes a database server to make a local copy of the file to the local file system.

Database Transport Procedures 150 include detach 222, clone 224, attach 226, pull 228, and push 229, as follows.

Detach 222 This procedure causes a database server to make a set of tablespaces read-only, to detach the tablespaces from the database, and return the names of the files in the tablespace ("tablespace files"). A database server makes a set of tablespaces read-only by only honoring and processing requests to read data from the tablespaces and preventing DML changes to data in the tablespace. Tablespace metadata for the set of tablespaces is exported to a separate file, referred to as a "metadata dump file."

The tablespace files and the metadata dump file together form a "transportable tablespace package". A transportable tablespace package can be transported using file transport procedures 210. A transportable tablespace package detached in this way can also be "re-attached" to a database from which it was detached.

Clone 224 This procedure copies tablespaces without detaching them. Specifically, the procedure causes a database server to make a set of tablespaces read-only, to copy their tablespace files to another set of tablespace files that may be specified by a parameter, and then making the set of tablespaces read-write (if read-write before invoking the procedure). The procedure also exports metadata for the set of tablespaces to a metadata dump file. The procedure returns the names of the new tablespace files and the metadata dump file.

Attach 226 This procedure causes a database server to attach a set of tablespaces in a transportable set package.

Figure 3:
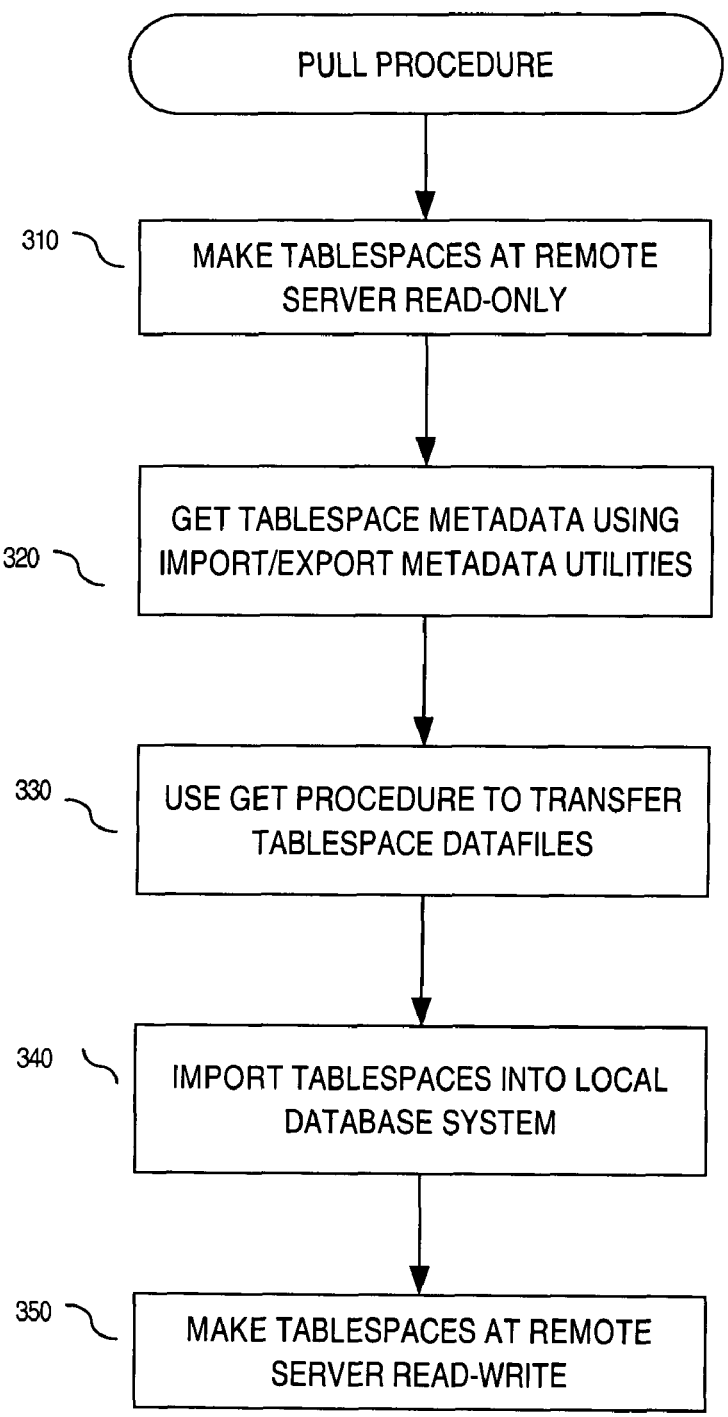
FIG. 3 is a flow chart depicting a process for automatically and dynamically provisioning tablespaces according to an embodiment of the present invention.

Pull 228 This procedure causes a database server to copy a set of tablespaces from a remote database (one that is not local to the database server) of a remote database server and attach the tablespace into a local database of the database server. Thus, the procedure completely provisions a tablespace. FIG. 3 illustrates this procedure.

Referring to FIG. 3, at step 310 the tablespaces at the remote server are made read-only. At step 320, the database server gets metadata describing the tables using metadata import/export utilities. Such utilities allow clients and database servers to connect to another database server and get metadata describing database objects, including metadata describing tables and tablespaces and database objects within tablespaces. At step 330, the database server uses get 212 to get a copy of the tablespaces and store them in the local file system. At step 340, the tablespaces are imported into the local database by attaching them, using the tablespace metadata obtained at step 320. At step 350, the tablespaces at the remote server are made read-write.

Push 229 This procedure causes a source database server to copy a set of tablespaces and import them into a local database of a remote database server. This procedure may be implemented by sending a message via rules-based messaging system 140 to the remote database server, the message specifying the tablespaces to "pull". The remote database server then invokes pull 228 to provision the tablespaces in the local database. Another way to implement this procedure is for a source database server to use put 214 to transport a copy of the tablespace to a remote database, to invoke metadata import/export utilities to transmit the tablespace metadata describing the tablespaces to the remote database server, and instruct the remote database server to attach the copies using the tablespace metadata.

Automatic Provisioning of Tablespace Synchronization Mechanisms

Once a copy of a tablespace is provisioned into another database, rule-based messaging system 140 may be used to keep the tablespace and its copy synchronized. To do so, various components of a rule-based messaging system 140 must be provisioned.

Figure 4:
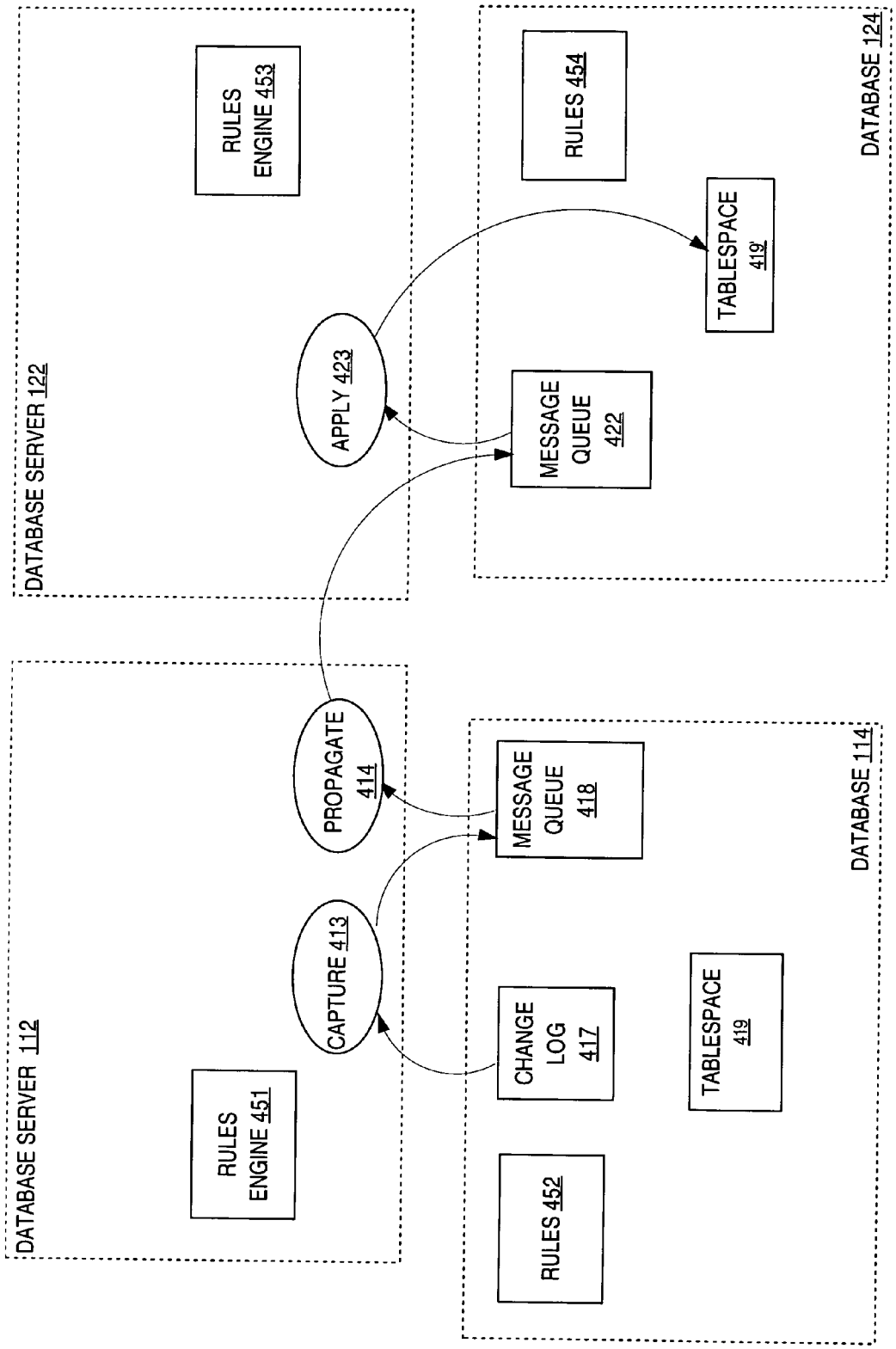
FIG. 4 is a block diagram depicting a mechanism for synchronizing tablespaces that may be automatically and dynamically provisioned according to an embodiment of the present invention.
Figure 5:
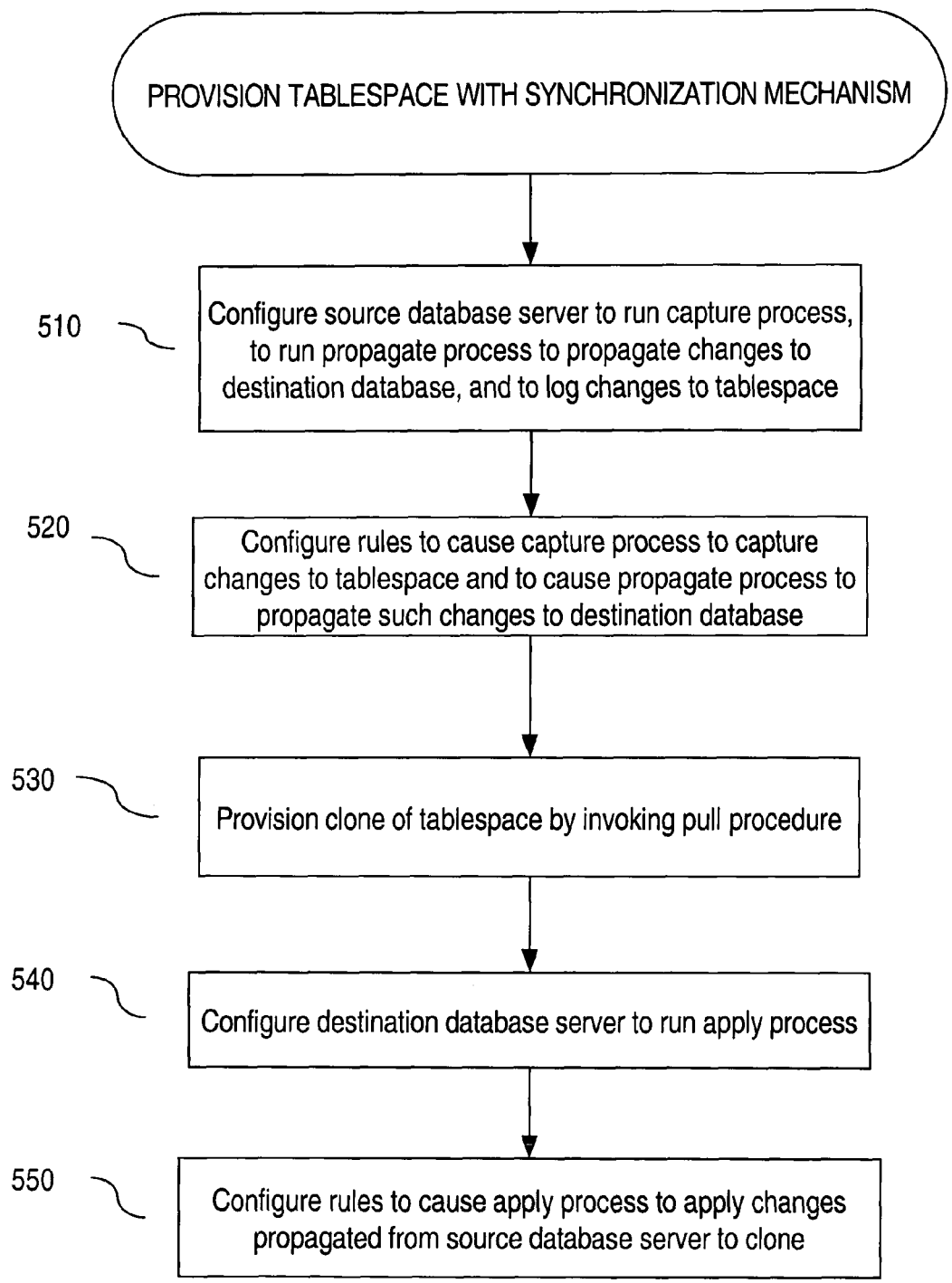
FIG. 5 is a flow chart for automatically and dynamically provisioning a tablespace and tablespace synchronization mechanism according to an embodiment of the present invention.

FIG. 4 is a block diagram illustrating components provisioned to synchronize a tablespace and its provisioned copy. FIG. 5 is a flowchart depicting a process for automatically provisioning a tablespace copy and rule-based messaging system components that are needed to synchronize the tablespace copy with the tablespace. These components and processes are illustrated using distributed database system 101.

FIG. 4 shows a rule-based messaging system 140 in greater detail, according to an embodiment of the present invention. Referring to FIG. 4, it shows that database server 112 includes a capture process 413, which captures events (e.g. DML changes and DDL changes) recorded by database server 112 in change log 417. Change log 417 contains redo and/or undo records. Capture process 413 queues messages reflecting those events into message queue 418. Propagate process 414 propagates messages from message queue 418 to message queue 422. Message queue 422 is a staging area for messages to be applied by database server 122 to database 124.

Rules engines 451 and 453 execute rules 452 and 454, respectively, in response to requests from clients to evaluate rule sets in rules 452 or 454, and then returns the evaluation results of evaluating the rule sets to the clients. Clients of rules engine 451 include capture process 413 and propagate process 414. Clients of rules engine 453 include apply process 423. Capture process 413, propagate process 414, and apply process 423 use the results of rules evaluation provided by rules engine 451 and 453 to determine how to process events and messages. This is accomplished by transmitting a request to execute rule sets to a rules engine. In response to such a request, rules engines 451 and 453 execute one or more of the rule sets. Rules-based messaging system are described in greater detail in *Utilizing Rules in Distributed Information Sharing and Utilizing Rules in a Distributed Information Sharing System*.

The process depicted in FIG. 5 is illustrated by using it to provision a copy of tablespace 419 (FIG. 4) into database 124 as tablespace 419'. Database 114 is referred to as the source database because it contains the tablespace copied and database 124 as the destination database because it is the database to which the copy is attached. Database servers 112 and 122 are referred to as the source database server and destination database server, respectively, because they are the local database servers of source database 114 and destination database 124, respectively.

Referring to FIG. 5, at step 510, source database server 112 is configured to log DML changes to tablespace 419 (i.e. changes to database objects stored in tablespace 419), to run capture process 413 to capture changes to tablespace 419, and to run propagate process 414 to propagate changes to tablespace 419 to destination database server 122.

At step 520, rules 452 are configured to cause capture process 413 to capture changes to tablespace 419 and to propagate the changes to destination database server 122 and message queue 422.

At step 530, a clone of tablespace 419, tablespace 419', is provisioned at destination database server 122 by invoking pull procedure 228.

At step 540, destination database server 122 is configured to run an apply process to apply changes from message queue 422.

At step 550, rules 454 are configured to cause apply process 423 to apply changes to tablespace 419 to tablespace 419' (i.e. to apply changes to database objects within tablespace 419 to database objects within 419').

So that the process depicted in FIG. 4 may be used to automatically and dynamically provision a tablespace, the process can be implemented as a procedure that is invoked to provision a tablespace and rule-based messaging components to a particular database or database server. Alternately, a script can be generated and later executed to provision the tablespace and/or the synchronization mechanism.

The process depicted in FIG. 4 provisions a synchronization mechanism that is unilateral, that is, changes to a tablespace are only propagated from one tablespace to another and not vice versa. However, an embodiment of the present invention is not so limited. Bilateral synchronization mechanisms may also be automatically provisioned. For example, the rules and message flow processes may be configured to propagate changes from tablespace 419' to tablespace 419 by configuring capture, propagate, and apply processes, and rules in a manner similar to that described to propagate changes from tablespace 419 to tablespace 419'.

Additional Features of Embodiments of the Invention

While the approaches to provisioning tablespaces have been illustrated by provisioning online tablespaces, the present invention is not so limited. The approaches described herein may be used to automatically and dynamically provision copies of offline tablespaces.

For example, an offline tablespace 180 may contain information about quarterly financial results. The data in the tablespace is only processed and reported quarterly for a brief period of time each quarter. Rather than keeping the tablespace online where it occupies resources (e.g. storage capacity), the information can be kept offline and provisioned and "unprovisioned" quarterly, freeing up resources and allowing the resources to be used for other services.

Although the approaches described herein provision data in the form of tablespaces, the present invention is not limited to provisioning data that is identified by tablespace. The present invention may be used to automatically provision a list of tables, schemas and databases, and a synchronization mechanism needed to keep them in sync, both bilaterally and unilaterally. Provisioning lists of tables, schemas, or databases gives customers more flexibility and a logical way to automatically provision data and keep it synchronized.

Synchronization mechanisms can be provisioned within distributed database systems that fall into numerous kinds of topologies. A network of database servers interlinked by messaging systems may be represented by directed graphs of nodes. Edges join the nodes, each edge representing a flow of messages from a "source" node to another adjacent "destination" node. For a given node, multiple edges can emanate from the node or terminate at the node. In addition, there can be cycles, representing messages flowing from a source node back to the source node along a path that may include one or more other nodes. Data and/or synchronization mechanisms can be automatically provisioned in topologies that can be represented by various types of directed graphs, such as an acyclic graph or a completely connected graph, where changes between the adjacent nodes are bilaterally synchronized.

Nor are the approaches for automatically and dynamically provisioning data limited to provisioning database data. The approaches may be used to provision software and computer code, such as PL/SQL packages. Database servers provide code import/export utilities for exporting code to "code dump files", and for importing code from code dump files. To automatically provision code, for example, a database server could invoke a code import/export utility to export the code from a remote database server and store the code in a dump file in the local file system, and then invoke the code import/export utility to import the code into the local database or code repository. The automatic provisioning of code could be used for remote job scheduling on a remote database server. A database server could delegate a job or task to a remote database server and provide the needed code and/or data to perform the job or task by automatically provisioning the code and data.

Use of Other File-Based Database Provisioning Approaches

Embodiments of the present invention have been illustrated using transportable tablespaces as an approach for instantiating a database, that is making a copy of a database and provisioning it. However, the present invention is not so limited. Embodiments of the present invention may use other techniques for this purpose.

For example, a database may be instantiated using the command generation approach. Under the command generation approach, a database server creates a file that contains a description of database objects (i.e. metadata) and database language commands that insert data into the database objects. Such a file is referred to herein as an import/export file. The import/export file may be created using, for example, export utilities designed to export database data for selected database objects in the database by creating metadata that describes the database objects and SQL insert commands that insert rows in the database object. To provision the database data, a database server executes import utilities designed to import the data by reading the description of the database objects, ensuring that the database objects are defined in the target database (defining them if necessary), and then executing the SQL insert commands. The execution of the SQL insert commands inserts the data row-by-row into the target database, which requires more work than attaching a tablespace when inserting greater than a threshold amount of data.

This approach may be advantageous for provisioning a target database under various circumstances. One is when the target database already defines the database objects for the data to provision and the overhead of creating a definition of the database objects is therefore not incurred, and the amount of data to provision is small and the overhead of row-by-row insertion is therefore not significant.

Another circumstance is when, under the tablespace approach, a set of database objects to instantiate cannot be instantiated without having to instantiate other database objects. A tablespace is used to store data for a particular set of database objects. In some implementations of tablespaces, when using the tablespace to instantiate database objects, all the database objects in the set must be instantiated. However, under the command generation approach, it is possible to create import/export files for only a selected subset of the database objects in the set or even from other tablespaces, enabling the ability to instantiate only the selected database objects no matter which tablespace is used to store their data. Thus, the command generation approach can provide more flexibility in forming combinations of database objects to instantiate.

To instantiate a copy of the database dynamically, a database server runs export utilities to create an import/export file, which is then transported between database servers using a database server file transport mechanism or messaging system, such as database server file transport mechanism 130 or rule based messaging system 140. Alternatively, import/export files may be stored as part of a library, to be transported and provisioned sometime later when needed.

Another approach to instantiating a database is the recovery manager approach. The recovery manager approach uses the capabilities of a recovery manager to instantiate a database. A recovery manager is used to create backup files of all database files (e.g. tablespace files) and restore database files from the backup files. Restoring the database files instantiates a copy of a database at the time of creation of the backup files. If changes to a database are archived in an archive log, the archive log may be used to restore the changes. In fact, a database can be restored to any particular point in time covered by an archive log.

A source database can be instantiated by using a recovery manager to create the backup files and using the backups and a recovery manager to create a target database at another location. If the backups are stored for a period time before creating the target database, and during the period time the source database changes, an archive log of the source database may be used to make the target database current or consistent with the source database at some particular point in time. In fact, it may be more efficient to instantiate multiple instances at different times from one set of backup files by using the archive log of the source database to update the multiple instances to make them consistent with a given point of time.

Hardware Overview

Figure 6:
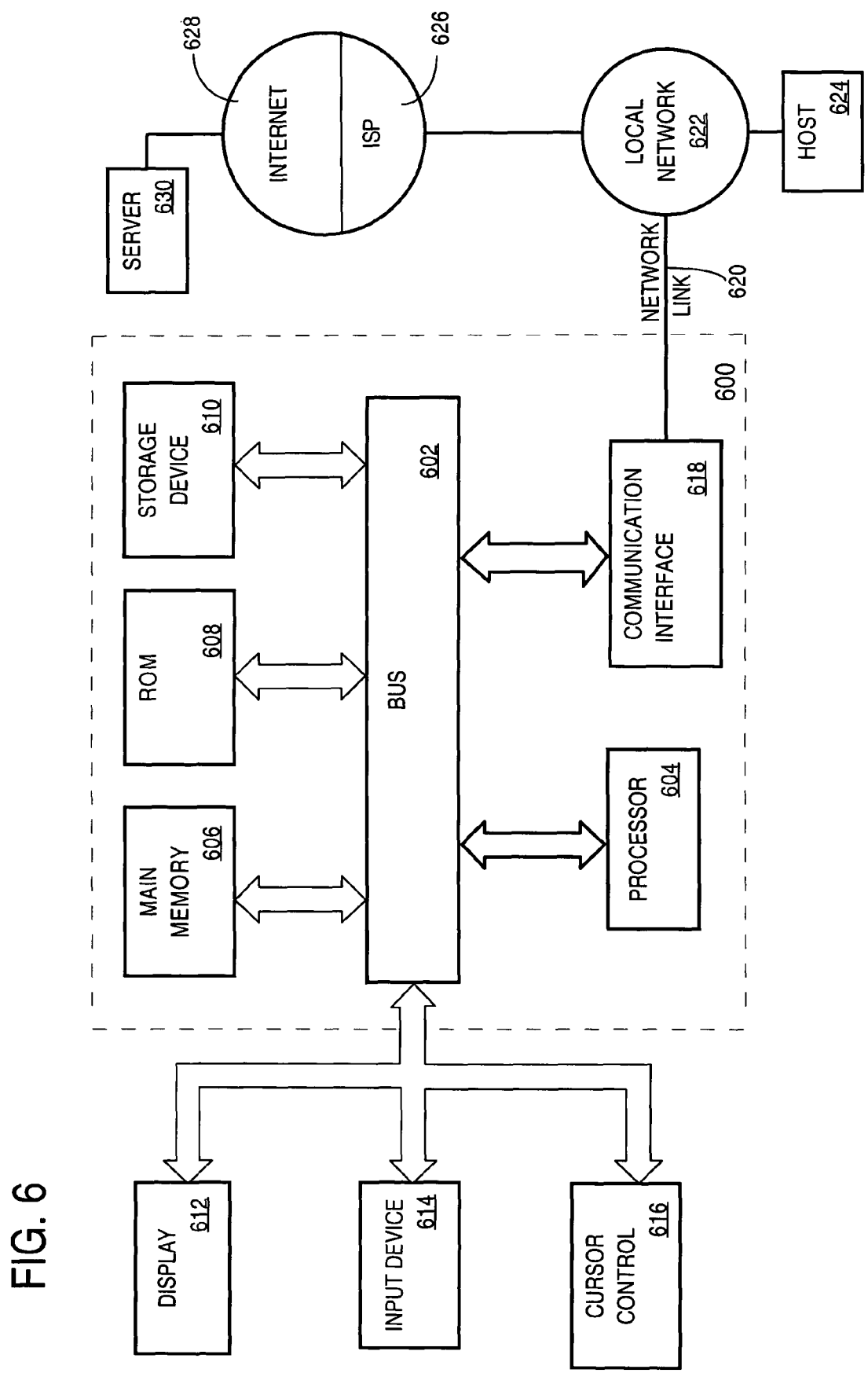
FIG. 6 is a block diagram depicting a computer system that may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically provisioning data in a distributed database system, the method comprising computer-implemented steps of:
   a database server running under control of a first operating system that manages resources of a first computing element, wherein said database server comprises database server code separate from said first operating system;
   said database server transporting a tablespace from a second file system to a first file system, wherein said first file system is managed by said first operating system, wherein transporting a tablespace from a second file system to a first file system is performed pursuant execution of one or more routines of said database server code; and
   after transporting said tablespace to said first file system, said database server importing said tablespace into a local database managed by said database server.

2. The method of claim 1,
   wherein a database server transporting a tablespace and the step of said database server importing said tablespace are both performed in response to invocation of a routine of said database server code; and
   wherein said routine is written in code that conforms to a database language and that may be executed by a database server.

3. A computer-readable storage medium carrying one or more sequences of instructions which, when executed by one or more processors, causes the one or more processors to perform the method recited in claim 2.

4. The method of claim 1, wherein the step of importing includes attaching said tablespace to said local database.

5. A computer-readable storage medium carrying one or more sequences of instructions which, when executed by one or more processors, causes the one or more processors to perform the method recited in claim 4.

6. The method of claim 1, wherein the tablespace is attached to another database before and during performance of the step of said database server causing a tablespace to be transported.

7. A computer-readable storage medium carrying one or more sequences of instructions which, when executed by one or more processors, causes the one or more processors to perform the method recited in claim 6.

8. The method of claim 1, wherein the tablespace is offline before and during performance of the step of said database server causing a tablespace to be transported.

9. A computer-readable storage medium carrying one or more sequences of instructions which, when executed by one or more processors, causes the one or more processors to perform the method recited in claim 8.

10. The method of claim 1, wherein:
    the step of importing the tablespace includes attaching a copy of the tablespace, wherein the copy is different than said tablespace; and
    said database server provisions a synchronization mechanism that applies changes made to the tablespace to the copy.

11. The method of claim 10, wherein the synchronization mechanism applies changes made to the copy to the tablespace.

12. A computer-readable storage medium carrying one or more sequences of instructions which, when executed by one or more processors, causes the one or more processors to perform the method recited in claim 11.

13. The method of claim 10, wherein the steps further include:
    the synchronization mechanism determining which changes to the tablespace to propagate to the copy based on the results of an evaluation of a set of rules by a rules engine; and
    wherein the step of provisioning the synchronization mechanism includes configuring said set of rules.

14. A computer-readable storage medium carrying one or more sequences of instructions which, when executed by one or more processors, causes the one or more processors to perform the method recited in claim 13.

15. A computer-readable storage medium carrying one or more sequences of instructions which, when executed by one or more processors, causes the one or more processors to perform the method recited in claim 10.

16. A computer-readable storage medium carrying one or more sequences of instructions which, when executed by one or more processors, causes the one or more processors to perform the method recited in claim 1.

17. A method for automatically instantiating database data in a distributed database system, the method comprising computer-implemented steps of:
    a database server running under control of a first operating system that manages resources of a first computing element, wherein said database server comprises database server code separate from said first operating system;
    said database server transporting a set of one or more files from a second file system to a first file system, wherein said first file system is managed by said first operating system, wherein transporting said set of one or more files from a second file system to a first file system is performed pursuant execution of one or more routines of said database server code;
    wherein said set of one or more files store said database data; and
    after transporting said set of one or more files to said first file system, said database server provisioning said database data as at least part of a database managed by said database server.

18. The method of claim 17, wherein the set of files is a tablespace, wherein the step of provisioning includes:
    attaching said tablespace to said database managed by said database server.

19. A computer-readable storage medium carrying one or more sequences of instructions which, when executed by one or more processors, causes the one or more processors to perform the method recited in claim 18.

20. The method of claim 17, wherein said set of one or more files includes metadata describing database objects and commands for inserting data into the database objects, wherein the step of provisioning includes importing said database data into said database by executing said commands.

21. A computer-readable storage medium carrying one or more sequences of instructions which, when executed by one or more processors, causes the one or more processors to perform the method recited in claim 20.

22. The method of claim 17, wherein said set of one or more files includes backup files created by a recovery manager, wherein the step of provisioning includes causing said recovery manager to create said database managed by said database server from said backup files.

23. A computer-readable storage medium carrying one or more sequences of instructions which, when executed by one or more processors, causes the one or more processors to perform the method recited in claim 22.

24. A computer-readable storage medium carrying one or more sequences of instructions which, when executed by one or more processors, causes the one or more processors to perform the method recited in claim 17.

* * * * *

UNITED STATES PATENT AND TRADEMARK OFFICE
CERTIFICATE OF CORRECTION

| | | |
|---|---|---|
| PATENT NO. | : 7,873,684 B2 | |
| APPLICATION NO. | : 10/718747 | |
| DATED | : January 18, 2011 | |
| INVENTOR(S) | : Benny Souder et al. | |

It is certified that error appears in the above-identified patent and that said Letters Patent is hereby corrected as shown below:

On Title Page 2, Item (56), under "Other Publications", line 5, delete "Transittal" and insert -- Transmittal --, therefor.

In column 7, line 11, delete "FFP." and insert -- FTP. --, therefor.

Signed and Sealed this

Thirteenth Day of September, 2011

David J. Kappos
*Director of the United States Patent and Trademark Office*